(12) United States Patent
Kang et al.

(10) Patent No.: US 10,110,338 B2
(45) Date of Patent: Oct. 23, 2018

(54) APPARATUS AND METHOD FOR DETECTING OPTICAL SIGNAL

(71) Applicant: ELECTRONICS AND TELECOMMUNICATIONS RESEARCH INSTITUTE, Daejeon (KR)

(72) Inventors: Sae-Kyoung Kang, Daejeon (KR); Joon Young Huh, Daejeon (KR); Joon Ki Lee, Daejeon (KR); Jie Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/625,430

(22) Filed: Jun. 16, 2017

(65) Prior Publication Data
US 2017/0373783 A1    Dec. 28, 2017

(30) Foreign Application Priority Data

Jun. 24, 2016    (KR) .................. 10-2016-0079588
Nov. 24, 2016    (KR) .................. 10-2016-0157231

(51) Int. Cl.
*G02B 27/10*    (2006.01)
*H04B 10/43*    (2013.01)
(Continued)

(52) U.S. Cl.
CPC .......... *H04J 14/02* (2013.01); *G02B 27/1006* (2013.01); *G02B 27/14* (2013.01);
(Continued)

(58) Field of Classification Search
CPC ....... H04B 10/27; H04B 10/572; H04J 14/02; G02B 27/14; G02B 27/1006
(Continued)

(56) References Cited

U.S. PATENT DOCUMENTS

2006/0098697 A1    5/2006    Kim et al.
2011/0058771 A1*   3/2011    Lee .................. G02B 6/4215
                                                                385/33

(Continued)

FOREIGN PATENT DOCUMENTS

KR    10-2011-0060403 A    6/2011
KR    10-2012-0056480 A    6/2012

OTHER PUBLICATIONS

Toshihide Yoshimatsu et al. "Compact and high-sensitivity 100-Gb/s (4×25 Gb/s) APD-ROSA with a LAN-WDM PLC demultiplexer", Optics Express B393, vol. 20, No. 26, Dec. 2012.

*Primary Examiner* — Dalzid Singh
(74) *Attorney, Agent, or Firm* — LRK Patent Law Firm

(57) ABSTRACT

An optical signal detecting apparatus and method. The optical signal detecting apparatus includes an optical demultiplexer configured to demultiplex an input optical signal into a first optical signal having a first band wavelength and a second optical signal having a second band wavelength, a first optical detector configured to detect the first optical signal, and a second optical detector configured to detect the second optical signal, and the optical demultiplexer, the first optical detector, and the second optical detector may be provided in a TO-CAN package.

15 Claims, 8 Drawing Sheets

(51) Int. Cl.
*H04J 14/02* (2006.01)
*G02B 27/14* (2006.01)
*H04B 10/27* (2013.01)
*H04B 10/572* (2013.01)

(52) U.S. Cl.
CPC ........... *G02B 27/141* (2013.01); *H04B 10/27* (2013.01); *H04B 10/572* (2013.01)

(58) Field of Classification Search
USPC .......................................................... 398/79
See application file for complete search history.

(56) References Cited

U.S. PATENT DOCUMENTS

| | | | |
|---|---|---|---|
| 2012/0128295 A1* | 5/2012 | Lim ..................... | G02B 6/4246 385/24 |
| 2014/0178069 A1 | 6/2014 | Kim et al. | |
| 2014/0346323 A1 | 11/2014 | Fujimura et al. | |
| 2016/0170145 A1* | 6/2016 | Kawamura .......... | G02B 6/4261 250/226 |
| 2016/0282181 A1* | 9/2016 | Shibayama ............... | G01J 3/26 |
| 2017/0131474 A1* | 5/2017 | Dannenberg ....... | G02B 6/29367 |

* cited by examiner

APPARATUS AND METHOD FOR DETECTING OPTICAL SIGNAL

CROSS-REFERENCE TO RELATED APPLICATIONS

This application claims the priority benefit of Korean Patent Application No. 10-2016-0079588, filed on Jun. 24, 2016, and Korean Patent Application No. 10-2016-0157231, filed on Nov. 24, 2016, in the Korean Intellectual Property Office, the disclosures of which are incorporated herein by reference for all purposes.

BACKGROUND

1. Field

One or more example embodiments relate to an apparatus and method for detecting an optical signal.

2. Description of Related Art

As an amount of data to be transmitted by an optical transmitter in an optical communication system increases, a wavelength division multiplexing (WDM) transmission method may be applied to multiplex a plurality of wavelength signals into a single optical fiber and transmit the multiplexed signals.

The WDM transmission method is introduced to a field of a backbone transmission network and also a short-range Ethernet transmission, and may transmit a 100 gigabit (G) Ethernet signal through a single-mode and multi-mode optical fiber.

An optical signal may be converted through an optical source having a plurality of wavelengths, and the optical transmitter may perform a WDM on the optical signal to obtain a single optical fiber through an optical multiplexer and transmit the multiplexed optical signal. An optical receiver in the optical communication system may then receive the optical signal having the plurality of wavelengths.

SUMMARY

An aspect provides an optical signal detecting apparatus that may be advantageous in terms of manufacture and module cost reduction by producing a module for detecting a massive multi-wavelength optical signal.

According to an aspect, there is provided an optical signal detecting apparatus including an optical demultiplexer configured to demultiplex an input optical signal into a first optical signal having a first band wavelength and a second optical signal having a second band wavelength, a first optical detector configured to detect the first optical signal, and a second optical detector configured to detect the second optical signal. The optical demultiplexer, the first optical detector, and the second optical detector may be provided in a TO-CAN package.

The optical demultiplexer, the first optical detector, and the second optical detector may be disposed on a TO-STEM of the TO-CAN package, and sealed by a sealing cap and a transparent element of the TO-CAN package.

The optical demultiplexer may include an optical filter configured to transmit the first optical signal and reflect the second optical signal.

The optical demultiplexer may include a first reflector configured to reflect a second optical signal reflected by the optical filter.

The optical filter and the first reflector may be disposed on an inclined block.

The optical demultiplexer may further include a second reflector configured to reflect, towards the second optical detector, a second optical signal reflected by the first reflector.

The second optical signal may be reflected between the first reflector and the second reflector, and proceed towards the second optical detector.

The optical signal detecting apparatus may further include a first optical coupling lens configured to focus the first optical signal towards the first optical detector, and a second optical coupling lens configured to focus the second optical signal towards the second optical detector.

The optical demultiplexer may include a first inclined block on which the optical filter is disposed, and a second inclined block on which a reflector is disposed. The first optical signal may pass through the optical filter and the first inclined block to be input to the first optical detector, and the second optical signal may be reflected by the reflector to be input to the second optical detector.

The optical demultiplexer may include a first inclined block on which the optical filter and a second reflector are disposed, and a second inclined block on which a first reflector is disposed. The first optical signal may pass through the optical filter and the first inclined block to be input to the first optical detector, and the second optical signal may be reflected between the second reflector and the first reflector to proceed towards the second optical detector.

According to another aspect, there is provided an optical signal detecting apparatus including a first optical coupling lens configured to transmit an incident light, an optical demultiplexer configured to demultiplex an optical signal transmitted from the first optical coupling lens, a second optical coupling lens configured to transmit the demultiplexed optical signal, and an optical detector configured to detect an optical signal transmitted from the second optical coupling lens. The optical demultiplexer may be connected to an input optical waveguide and an output optical waveguide.

According to still another aspect, there is provided an optical signal detecting method including demultiplexing, by an optical demultiplexer, an input optical signal into a first optical signal having a first band wavelength and a second optical signal having a second band wavelength, detecting, by a first optical detector, an optical signal having a wavelength in a first band, and detecting, by a second optical detector, an optical signal having a wavelength not in the first band. The optical demultiplexer, the first optical detector, and the second optical detector may be provided in a TO-CAN package.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
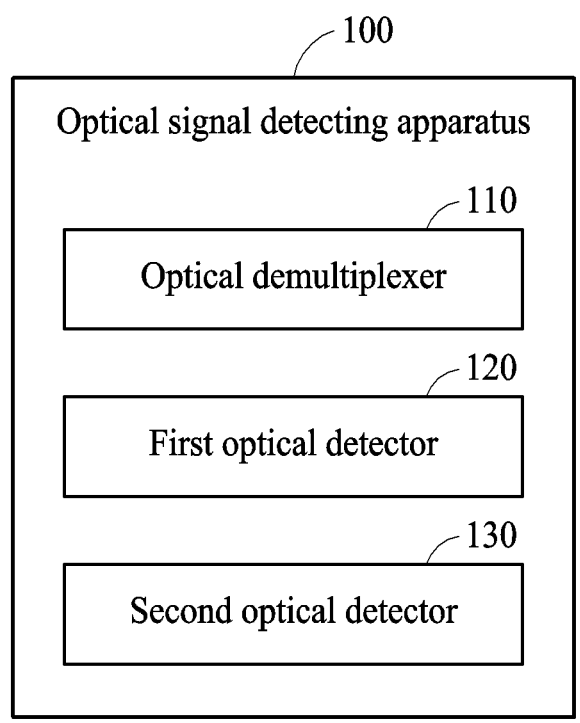
FIG. 1 is a block diagram illustrating an example of an optical signal detecting apparatus according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a block diagram illustrating an example of an optical signal detecting apparatus according to an example embodiment.

Referring to FIG. 1, an optical signal detecting apparatus 100 includes an optical demultiplexer 110, a first optical detector 120, and a second optical detector 130. The optical demultiplexer 110 may demultiplex an input optical signal into a first optical signal having a first band wavelength and a second optical signal having a second band wavelength. The optical demultiplexer 110 may include an optical filter configured to transmit the first optical signal having a wavelength in a first band and reflect the second optical signal having a wavelength not in the first band, or in a second band. The first optical signal may be output through one side of the optical demultiplexer 110, and the second optical signal may be output through another side of the optical demultiplexer 110.

The optical demultiplexer 110, the first optical detector 120, and the second optical detector 130 may be provided in a TO-CAN package. The TO-CAN package may broadly include a TO-STEM and a cap. The TO-CAN package may be produced by disposing components on or above the TO-STEM and sealing the TO-CAN package by the cap. The optical demultiplexer 110, the first optical detector 120, and the second optical detector 130 may be disposed on the TO-STEM, and sealed by a transparent element, for example, a window glass, and a sealing cap. The input optical signal may be incident on the optical demultiplexer 110 through the transparent element. Providing or mounting such components of the optical signal detecting apparatus 100 in the TO-CAN package may facilitate the production of an optical signal detecting module and reduce a cost for the production. Examples of a structure of the optical signal detecting apparatus 100 will be described in detail with reference to FIGS. 2 through 7.

The optical signal detecting apparatus 100 may be the optical signal detecting module. The optical demultiplexer 110 may be an optical demultiplexing block, and the first optical detector 120 and the second optical detector 130 may be photodiodes (PDs).

The optical demultiplexer 110 may include the optical filter configured to transmit the first optical signal having the first band wavelength and reflect the second optical signal having the second band wavelength, or the wavelength in the second band other than the first band. The optical demultiplexer 110 may also include a first reflector configured to reflect a second optical signal reflected by the optical filter. The optical filter or the first reflector may be disposed on an inclined block.

The optical demultiplexer 110 may further include a second reflector configured to reflect a second optical signal reflected by the first reflector. The second reflector may be disposed on the inclined block on which the optical filter is disposed. Here, the first reflector may reflect a second optical signal reflected by the second reflector. The second reflector may reflect again an optical signal reflected by the first reflector to allow the second optical signal to proceed towards the first reflector. The second optical signal may be repetitively reflected between the first reflector and the second reflector to gradually proceed towards the second optical detector 130.

The optical signal detecting apparatus 100 may further include a first optical coupling lens and a second optical coupling lens. The first optical coupling lens and the second optical coupling lens may be an optical coupling lens block. The first optical coupling lens may be used to focus the first optical signal towards the first optical detector 120, and the second optical coupling lens may be used to focus the second optical signal towards the second optical detector 130.

The first optical detector 120 may detect the first optical signal. The first optical detector 120 may detect a first optical signal transmitted from the first optical coupling lens. The second optical detector 130 may detect the second optical signal. The second optical detector 130 may detect a second optical signal transmitted from the second optical coupling lens.

Here, a spacer may be used to dispose the first optical coupling lens separately from the first optical detector 120, and dispose the second optical coupling lens separately from the second optical detector 130.

The optical signal detecting apparatus 100 may be applied to the TO-CAN package or the TO-STEM that may be embodied with a relatively low cost, compared to a box-type package, to perform optical demultiplexing and optical detection. The optical signal detecting apparatus 100 may be more readily produced in an optical array arranging environment, using a relatively lower cost.

The TO-CAN package may include the TO-STEM that accommodates an optical device or an electronic device, and a lead pin connected to the optical device or the electronic device through a hole of the TO-STEM. The optical device, the electronic device, and a dielectric device, which may be used to convert an input optical signal to a current, such as the first optical detector 120 and the second optical detector 130, may be disposed on the TO-STEM.

Figure 2:
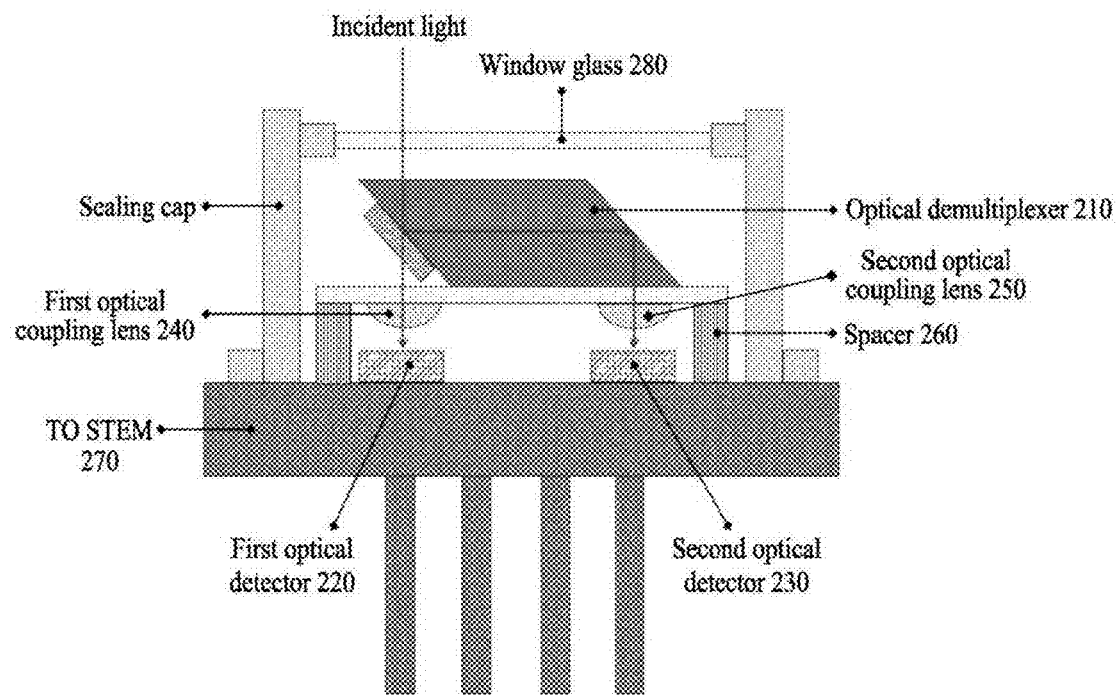
FIG. 2 is a diagram illustrating an example of a structure of an optical signal detecting apparatus according to an example embodiment.

FIG. 2 is a diagram illustrating an example of a structure of an optical signal detecting apparatus according to an example embodiment.

Referring to FIG. 2, an optical signal detecting apparatus may receive, as an input, a light to be incident in a form of a parallel beam. Here, for an optical connection to an external device, the optical signal detecting apparatus may be connected to an optical fiber ferrule in a form of an optical fiber connection or in a form of a receptacle.

The optical signal detecting apparatus may be applied to a TO-CAN package. Referring to FIG. 2, the optical signal detecting apparatus includes an optical demultiplexer 210, a first optical coupling lens 240, a second optical coupling lens 250, a first optical detector 220, and a second optical detector 230, which are disposed on a TO-STEM 270. For example, the optical signal being incident in a form of a parallel beam may be applied to the optical demultiplexer 210. Here, an optical signal of the applied optical signal that has a passband wavelength may be transmitted from an optical filter of the optical demultiplexer 210 to be applied to the first optical detector 220. The optical filter may be, for example, a thin film-type bandpass filter.

In addition, the optical filter may reflect an optical signal having a wavelength in a band that is not a passband. For example, in a case in which the optical filter forms an angle of 45 degrees (°), the optical signal may be reflected in a 90° direction with respect to an incident optical signal. Here, the reflected optical signal may be incident towards the second optical detector 230 through a reflector or a mirror plane of the optical demultiplexer 210, which is disposed in an opposite side of the optical filter. The reflector or the mirror plane may be a mirror, or be coated by a high-reflection (HR) coating. The reflector or the mirror plane may be formed at an angle of 45° to reflect the optical signal reflected by the optical filter in a 90° direction with respect to the incident optical signal.

The optical demultiplexer 210 may be disposed on the first optical coupling lens 240 or the second optical coupling lens 250. Here, the first optical coupling lens 240 and the second optical coupling lens 250, and the first optical detector 220 and the second optical detector 230 may be disposed separately from each other at regular intervals by a spacer 260. The optical demultiplexer 210, the first optical coupling lens 240 and the second optical coupling lens 250, and the first optical detector 220 and the second optical detector 230 may be provided on or above the TO-STEM 270 of the TO-CAN package. Here, for sealing, the optical signal detecting apparatus may include a sealing cap including a window glass 280 formed of a light-transmitting glass material. The sealing cap may be connected to the TO-STEM 270 through resistance welding by a sealing device to be sealed.

Figure 3A:
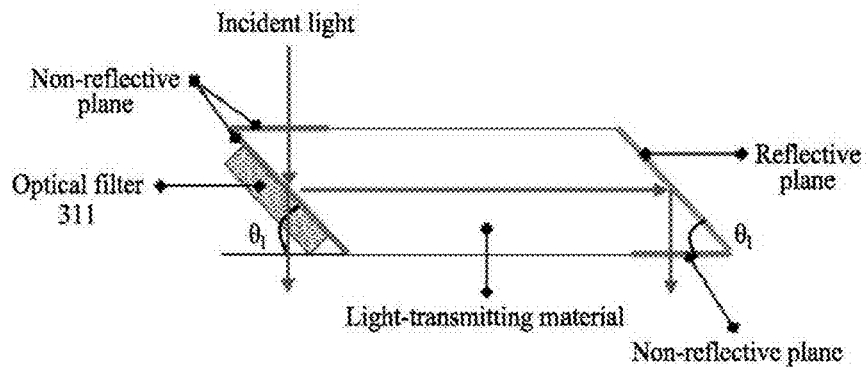
FIGS. 3A, 3B, and 3C are diagrams illustrating examples of an optical demultiplexer according to an example embodiment.
Figure 3B:
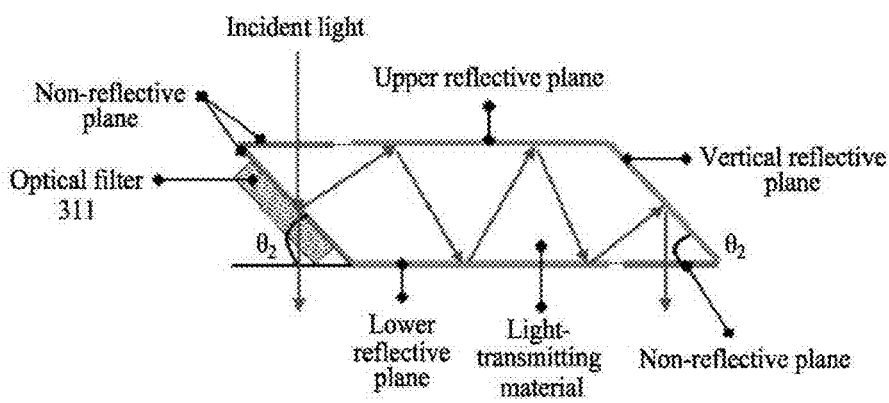
Figure 3C:
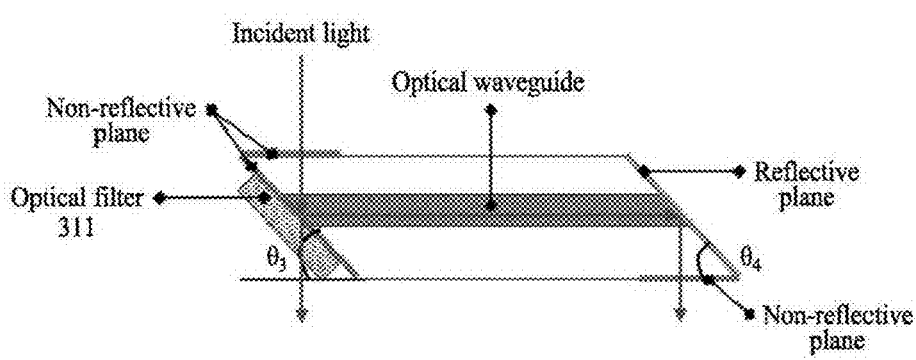

FIGS. 3A, 3B, and 3C are diagrams illustrating examples of an optical demultiplexer according to an example embodiment.

Referring to FIG. 3A, a medium of an optical demultiplexer 210 through which an optical signal proceeds may be of a light-transmitting material. The light-transmitting material may include at least one of glass, plastic, or silicone. The optical demultiplexer 210 may demultiplex an incident optical signal using such a light-transmitting material.

As illustrated, an optical filter 311 disposed on or included in the optical demultiplexer 210 is provided to have an inclination angle of $\theta_1$. Here, $\theta_1$ may be 45°. A reflector disposed in an opposite side of the optical filter 311 may be a mirror plane or a reflective plane. For example, the reflective plane may be formed to have an angle equal to $\theta_1$, or 45°, at which the optical filter 311 is mounted so that an optical signal reflected by the reflective plane may be output in a vertical direction.

A plane on which an optical signal is to be incident, a plane on which the optical filer 311 is mounted, and a plane to which an optical signal is output by being reflected by the reflective plane may be a non-reflective plane. The non-reflective plane may be coated through an anti-reflection (AR) coating. In addition, the reflective plane disposed in the opposite side of the optical filter 311 may be a mirror or be coated through an HR coating. An upper plane and a lower plane of the first optical coupling lens 240 or the second optical coupling lens 250 to and from which light is input and output may be coated through an AR coating based on a band of a wavelength of an optical signal. At least a portion of the optical demultiplexer 210 in a direction in which an optical signal proceeds towards the first optical coupling lens 240 or the second optical coupling lens 250 from the optical demultiplexer 210 may include the non-reflective plane or be coated through the AR coating.

Referring to FIG. 3B, the optical filter 311 of the optical demultiplexer 210 may have an inclination angle less than or equal to 45° as necessary. In addition, the optical filter 311 may have an inclination angle of $\theta_2$, which is less than 45°, as necessary. Here, in the optical demultiplexer 210, a medium through which an optical signal proceeds may be a light-transmitting material.

An optical signal in a form of a parallel beam may be applied to the optical filter 311 that is mounted at the angle $\theta_2$ less than or equal to 45°. Here, an optical signal having a wavelength corresponding to a passband may pass through the optical filter 311, and an optical signal having a wavelength corresponding to a band other than the passband may be reflected by the optical filter 311. In addition, the optical signal reflected by the optical filter 311 may be reflected by proceeding in zigzags by a reflective plane formed on an upper plane and a lower plane of the optical demultiplexer 210. Here, the reflective plane may include at least one of an upper reflective plane or a lower reflective plane. The optical signal proceeding in zigzags may be reflected in a vertical direction by a vertical reflective plane to be output. Here, the vertical reflective plane may be a mirror or coated through an HR coating.

An inclination angle of the vertical reflective plane may be equal to $\theta_2$ at which the optical filter 311 is mounted. A plane on which an optical signal is to be incident, a plane on which the optical filter 311 is mounted, and a plane to which an optical signal is output by being reflected by the vertical reflective plane may be a non-reflective plane coated through an AR coating. In addition, the upper reflective plane and the lower reflective plane of the optical demultiplexer 210 may be formed with a totally reflective material.

Referring to FIG. 3C, the optical demultiplexer 210 may include a planar lightwave circuit (PLC)-based optical waveguide or optical fiber. The PLC-based optical waveguide may include a silica or silicon-based optical waveguide. The optical fiber may include an upper portion and a lower portion including a V-groove formed on silicone or glass.

The optical filter 311 may be mounted at an inclination angle of $\theta_3$ based on an optical signal acceptance angle of the optical waveguide or the optical fiber. Here, $\theta_3$ may be 45°±the optical signal acceptance angle. In addition, a reflective plane disposed in an opposite side of the optical filter 311 may be formed at an inclination angle of $\theta_4$ to allow an optical signal to be output in a vertical direction. Here, $\theta_4$ may be 45°. A plane on which an optical signal is to be incident, a plane on which the optical filter 311 is mounted, and a plane to which an optical signal is output by being reflected by the reflective plane may be a non-reflective plane and coated through an AR coating. The reflective plane disposed in the opposite side of the optical filter 311 may be a mirror, or coated through an HR coating.

An incident optical signal may be reflected by the optical filter 311 and reflected by the reflective plane disposed in the opposite side, which is not in contact with the optical filter 311 through the optical waveguide, and then pass through the non-reflective plane and be output.

Figure 4:
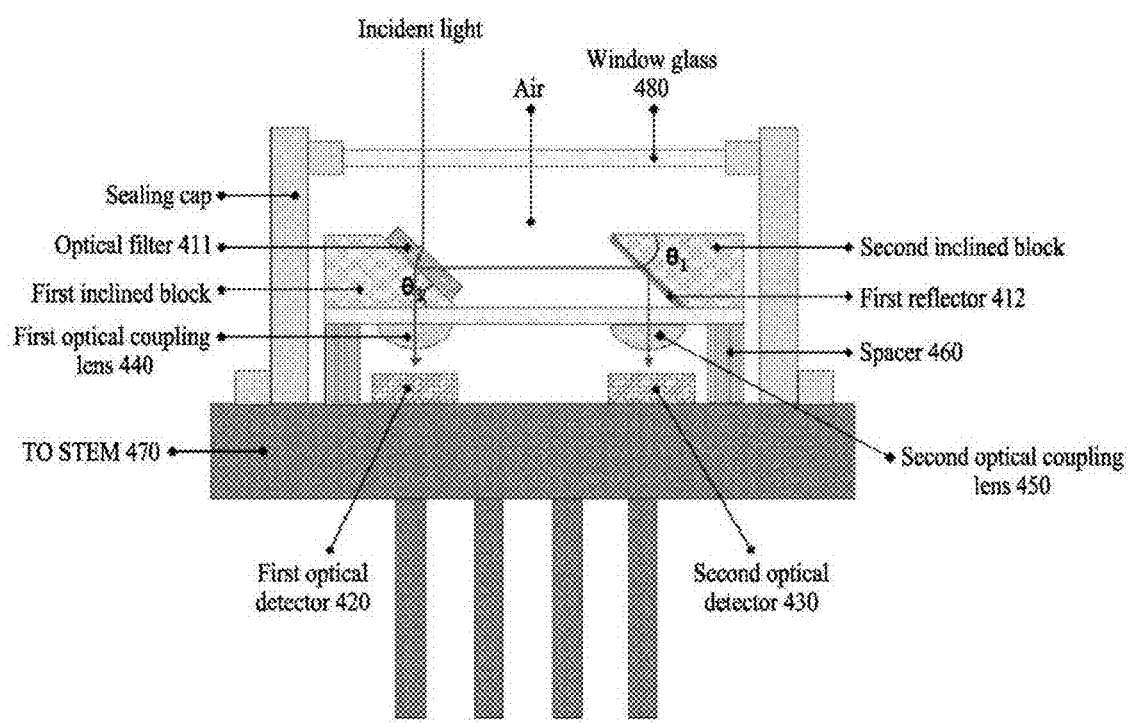
FIG. 4 is a diagram illustrating another example of a structure of an optical signal detecting apparatus according to an example embodiment.

FIG. 4 is a diagram illustrating another example of a structure of an optical signal detecting apparatus according to an example embodiment.

Referring to FIG. 4, an optical signal detecting apparatus includes an optical demultiplexer, an optical coupling lens, and an optical detector, which are disposed in a TO-CAN package or on a TO-STEM 470. The optical demultiplexer includes a first inclined block on which an optical filter 411 is disposed, and a second inclined block on which a first reflector 412 is disposed. The optical coupling lens includes a first optical coupling lens 440 and a second optical coupling lens 450. The optical detector includes a first optical detector 420 and a second optical detector 430.

In one example, an optical signal to be incident may be in a form of a parallel beam, and applied to the optical filter 411 mounted on an inclined plane of the first inclined block. The optical filter 411 may be a thin film-type bandpass filter, and disposed on the first inclined block or included in the first inclined block. An incident light may be split into a first optical signal with a first band wavelength and a second optical signal with a second band wavelength by the optical demultiplexer. The first optical signal may pass through the optical filter 411 and the first inclined block to be input to the first optical detector 420, and the second optical signal may be reflected by the first reflector 412 disposed on a boundary of the second inclined block to be input to the second optical detector 430. For example, an optical signal of the optical signal applied to the optical filter 411, which has a wavelength of a passband of the optical filter 411, may be transmitted from the optical filter 411 and pass through the optical coupling lens to be applied to the first optical detector 420. In addition, an optical signal of the optical signal applied to the optical filter 411, which has a wavelength of a band other than the passband of the optical signal 411, may be reflected.

The optical filter 411 may have an inclination angle of $\theta_1$, which may be 45°. Here, the optical signal reflected by the optical filter 411 may be reflected in a 90° direction with respect to the incident light, which is the incident optical signal. In addition, the optical signal reflected by the optical filter 411 may be reflected in a vertical direction by the first reflector 412 disposed in an opposite side of the optical filter 411. The first reflector 412 may be a mirror plane or a mirror, and coated through an HR coating, and included in the second inclined block or disposed on the second inclined block.

The optical signal reflected by the first reflector 412 may pass through the optical coupling lens to be incident to the second optical detector 430. Here, the first reflector 412 may have an inclination angle of $\theta_1$, which is 45°, and thus the optical signal may be reflected in a 90° direction with respect to a direction of the optical signal reflected by the optical filter 411, which is the incident optical signal. The optical demultiplexer may be disposed on the optical coupling lens mounted on a spacer 460. The optical coupling lens and the optical detector may be disposed separately from each other at a regular interval by the spacer 460.

An inclined plane of the first inclined block on which the optical filter 411 is disposed, and an upper plane and a lower plane of the optical coupling lens to and from which light is input and output may be coated through an AR coating based on a band of a wavelength an optical signal. In addition, to seal the optical signal detecting apparatus after at least one component of the optical signal detecting apparatus is provided in the TO-CAN package and mounted on the TO-STEM 470, the optical signal detecting apparatus may include a sealing cap including a window glass 480 formed of a glass material to enable light transmissibility in an upper portion of the optical signal detecting apparatus. The sealing cap may be welded to the TO-CAN package or the TO-STEM 470 through resistance welding by a sealing device, and thus the optical signal detecting apparatus may be sealed.

Figure 5:
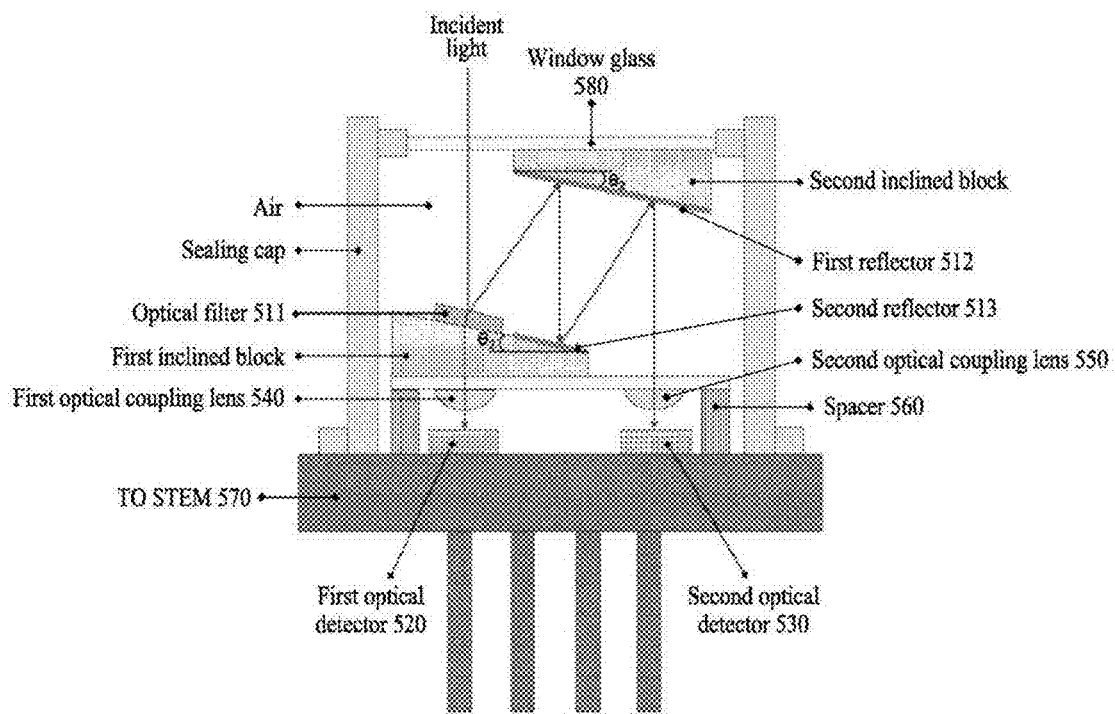
FIG. 5 is a diagram illustrating still another example of a structure of an optical signal detecting apparatus according to an example embodiment.

FIG. 5 is a diagram illustrating still another example of a structure of an optical signal detecting apparatus according to an example embodiment.

Referring to FIG. 5, an optical signal detecting apparatus includes an optical demultiplexer including a first inclined block and a second inclined block, a first optical coupling lens 540, a second optical coupling lens 550, a first optical detector 520, and a second optical detector 530, which are provided in a TO-CAN package and a TO-STEM 570. Such components of the optical signal detecting apparatus may be disposed on the TO-STEM 570, and sealed by a sealing cap and a window glass 580.

In one example, an optical signal to be incident may be in a form of a parallel beam, and applied to an optical filter 511 disposed on an inclined plane of the first inclined block. The optical filter 511 may be a thin film-type bandpass filter, and disposed on the first inclined block or included in the first inclined block. In addition, a second reflector 513 may be disposed on the first inclined block. A first optical signal of the optical signal applied to the optical filter 511, which has a wavelength of a passband of the optical signal 511, may be transmitted from the optical filter 511, and the transmitted optical signal may pass through the first optical coupling lens 540 to be applied to the first optical detector 520. In addition, a second optical signal of the optical signal applied to the optical filter 511, which has a wavelength of a band other than the passband of the optical filter 511, may be reflected. Here, the second optical signal may be reflected in a direction of the second inclined block, and the reflected optical signal may be reflected in zigzags by a first reflector 512 disposed on the second inclined block to form a zigzag reflection path. The optical signal may be reflected between the first reflector 512 and the second reflector 513 to proceed towards the second optical detector 530. The optical signal proceeding through the reflection path may pass through the second optical coupling lens 550 to be applied to the second optical detector 530.

The second inclined block may be disposed at a certain location in at least one portion of the window glass 580 disposed on the sealing cap. Here, an inclination angle $\theta_2$ of each of the first inclined block and the second inclined block may be determined based on a physical standard of the TO-CAN based optical signal detecting apparatus. As necessary, in a case of a multichannel, the inclination angle of each of the first inclined block and the second inclined block may be determined based on a distance between centers of signal channels. In addition, as necessary, the inclination angle of each of the first inclined block and the second inclined block may be determined based on an allowable angle of incidence of the optical filter 511.

The first inclined block may be disposed on the first optical coupling lens 540. A plane to which the optical filter 511 is mounted and a plane in contact with the first optical coupling lens 540 may be coated through an AR coating. In addition, the first inclined block may include the second reflector 513 on a plane adjacent to the optical filter 511 to allow the optical signal reflected by the first reflector 512 to be reflected in zigzags. Here, the first reflector 512 and the second reflector 513 may be a mirror plane or coated through an HR coating. In addition, an inclined plane of the second inclined block may be the first reflector 512.

An inclination angle $\theta_2$ of the second inclined block may be set to be equal to an inclination angle $\theta_2$ of the first inclined block based on the inclination angle $\theta_2$ of the first inclined block. Here, the first reflector 512 and the second reflector 513 may be disposed to be parallel to each other. In addition, the optical filter 511 and the first reflector 512 may be disposed to be parallel to each other. The optical signal reflected by the first reflector 512 may be reflected by the second reflector 513. In addition, the optical signal reflected by the second reflector 513 may be reflected again by the first reflector 512. That is, the optical signal reflected by the optical filter 511 may be reflected again by the first reflector 512 while proceeding in zigzags, and the reflected optical signal may proceed in a vertical direction to the second optical detector 530 or in a parallel direction to the incident light or beam to proceed towards the second optical coupling lens 550. The first inclined block may be disposed on the first optical coupling lens 540 disposed on a spacer 560. The first optical coupling lens 540 and the first optical detector 520 may be disposed separately from each other at a regular interval by the spacer 560. Similarly, the second optical coupling lens 550 and the second optical detector 530 may be disposed separately from each other at a regular interval by the spacer 560.

The inclined plane of the first inclined block on which the optical filter 511 is disposed, and an upper plane and a lower plane of the optical coupling lens to and from which light is input and output may be coated through an AR coating based on a band of a wavelength of an optical signal. In addition, to seal the optical signal detecting apparatus after at least one component of the optical signal detecting apparatus is provided in the TO-CAN package, the optical signal detecting apparatus may include the sealing cap including the window glass 580 formed of a glass material to enable optical transmissibility in an upper portion of the optical signal detecting apparatus. The sealing cap may be welded to the TO-CAN package or the TO-STEM 570 through resistance welding by a sealing device, and thus the optical signal detecting apparatus may be sealed.

Figure 6:
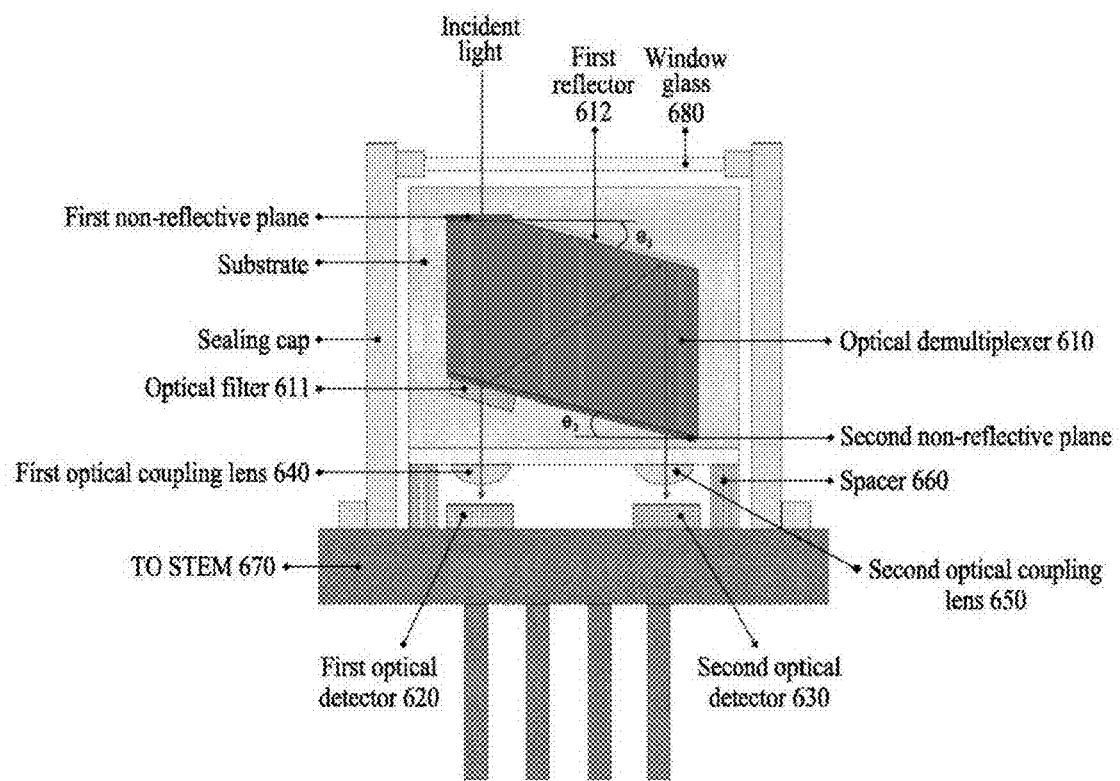
FIG. 6 is a diagram illustrating yet another example of a structure of an optical signal detecting apparatus according to an example embodiment.

FIG. 6 is a diagram illustrating yet another example of a structure of an optical signal detecting apparatus according to an example embodiment.

Referring to FIG. 6, an optical signal detecting apparatus includes an optical demultiplexer 610 disposed on a substrate of a TO-STEM 670. In addition, the optical signal detecting apparatus also includes a first optical coupling lens 640, a second optical coupling lens 650, a first optical detector 620, and a second optical detector 630.

In one example, an optical signal to be input or incident may be in a form of a parallel beam, and pass through a window glass 680 to be applied to an optical filter 611 disposed on the optical demultiplexer 610. Here, an optical signal of the applied optical signal, which has a wavelength of a passband of the optical filter 611, may be transmitted from the optical filter 611 and applied to the first optical detector 620 through the first optical coupling lens 640. In addition, an optical signal of the applied signal, which has a wavelength of a band other than the passband of the optical filter 611, may be incident to a first reflector 612 disposed on the optical demultiplexer 610 and reflected in a vertical direction to be applied to the second optical detector 630 through the second optical coupling lens 650. The first reflector 612 may include a mirror plane or an HR coating.

A first non-reflective plane may form an angle with the first reflector 612 in order not to form a single plane, and such an angle may facilitate an AR coating of the first non-reflective plane and the coating of the mirror plane of the first reflector 612. Here, an inclination angle $\theta_3$ of the optical demultiplexer 610 may be determined based on at least one of a physical standard of the TO-CAN package-based optical signal detecting apparatus, a distance between centers of signal channels in a case of a multichannel, or an allowable angle of incidence of the optical filter 611.

In a case of two channels, a second non-reflective plane may be disposed on a plane on which the optical filter 611 is disposed. In a case in which a number of channels is two or greater, an optical filter corresponding to an optical wavelength to be demultiplexed may be additionally provided to form a corresponding zigzag reflection path. Here, a number of optical coupling lenses or optical detectors may increase based on a number of added optical filters, or a passing and reflected wavelengths.

By setting inclination angles $\theta_3$ of an upper portion and a lower portion of the optical demultiplexer 610 to be equal and allowing an optical signal to proceed in zigzags, a final optical signal may proceed in a vertical direction with respect to the TO-STEM 670 or the second optical detector 630. A direction in which the final optical signal proceeds may also be set to be parallel to a direction of the incident light or beam. The substrate on which the optical demultiplexer 610 is disposed may be disposed on the first optical coupling lens 640 and the second optical coupling lens 650. In addition, the first optical coupling lens 640 and the second optical coupling lens 650 may be disposed separately from the first optical detector 620 and the second optical detector 630, respectively, by a spacer 660.

To seal the optical signal detecting apparatus after components of the optical signal detecting apparatus are mounted to the TO-STEM 670, a sealing cap including a window glass 680 formed of a glass material may be used to enable optical transmissibility in an upper portion of the optical signal detecting apparatus. The sealing cap may be welded to the TO-STEM 670 through resistance welding using a sealing device to seal the optical signal detecting apparatus.

Figure 7:
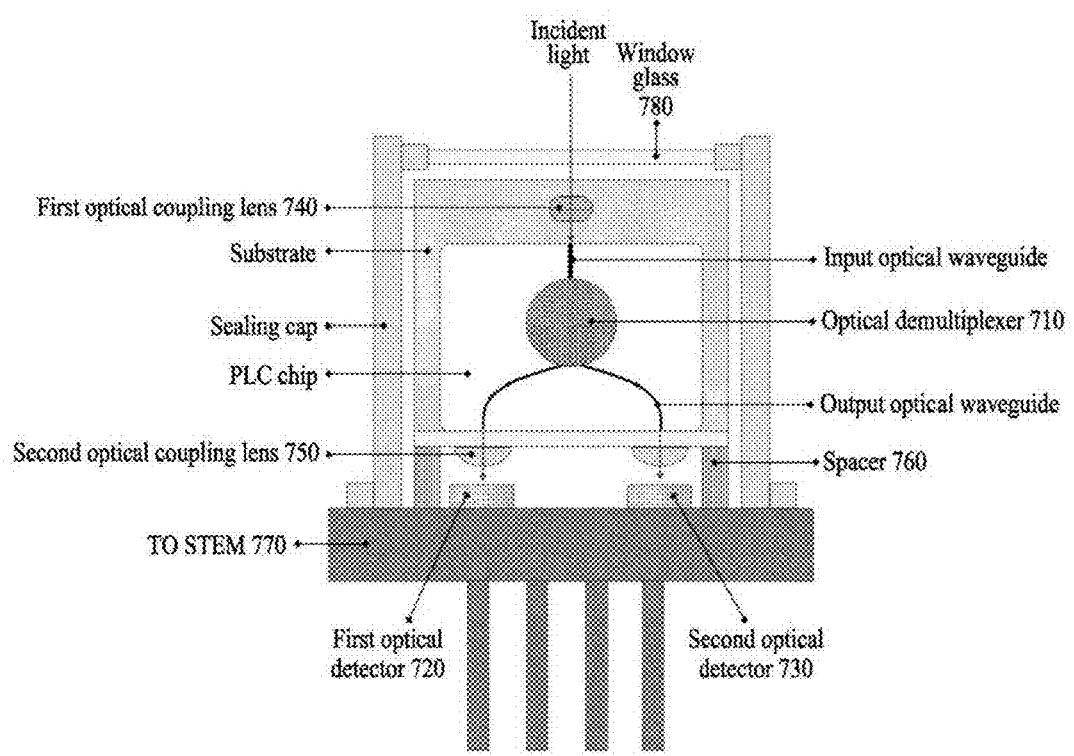
FIG. 7 is a diagram illustrating further another example of a structure of an optical signal detecting apparatus according to an example embodiment.

FIG. 7 is a diagram illustrating further another example of an optical signal detecting apparatus according to an example embodiment.

Referring to FIG. 7, an optical signal detecting apparatus includes a first optical coupling lens 740, an optical demultiplexer 710, a second optical coupling lens 750, and a plurality of optical detectors. The first optical coupling lens 740 may transmit an incident light, and the optical demultiplexer 710 may demultiplex an optical signal transmitted from the first optical coupling lens 740. In addition, the second optical coupling lens 750 may transmit the demultiplexed optical signal, and the optical detectors may detect an optical signal transmitted from the second optical coupling lens 750. The optical detectors may include a first optical detector 720 and a second optical detector 730. The optical demultiplexer 710 may be connected to an input optical waveguide and an output optical waveguide.

In one example, the optical signal detecting apparatus may include a PLC-based optical demultiplexer 710 that is disposed on a substrate of a TO-CAN package. In addition, the optical signal detecting apparatus may include the first optical coupling lens 740 and the second optical coupling lens 750. Here, the second optical coupling lens 750 may be a plurality of optical coupling lens blocks. In addition, the optical signal detecting apparatus may include the first optical detector 720 and the second optical detector 730. The incident optical signal may pass through the first optical coupling lens 740 and be optically coupled to the input optical waveguide in a PLC chip on the substrate. The PLC chip may include a silica or silicon-based element.

The optically coupled optical signal may be optically demultiplexed by the optical demultiplexer 710 in the PLC chip. Here, the optical demultiplexer 710 may include at least one of an arrayed waveguide grating (AWG), a Mach-Zehnder interference (MZI), or a ring. The first optical coupling lens 740 may be disposed on or included in a substrate for the PLC chip or a window glass 780. The optical signal demultiplexed through the PLC-based optical demultiplexer 710 may be output through the output optical waveguide. The output optical signal may be applied to the first optical detector 720 or the second optical detector 730 through the second optical coupling lens 750.

For example, a number of channels may be expanded to two or greater. The substrate on which the PLC chip is disposed may be disposed on the second optical coupling lens 750 that is mounted to a spacer 760. In addition, the second optical coupling lens 750 may be disposed separately from the first optical detector 720 and the second optical detector 730 at regular intervals by the spacer 760.

To seal the optical signal detecting apparatus after components of the optical signal detecting apparatus are provided on or above a TO-STEM 770, a sealing cap including the window glass 780 formed of a glass material may be used to enable optical transmissibility in an upper portion of the optical signal detecting apparatus. The sealing cap may be welded to the TO-STEM 770 through resistance welding using a sealing device to seal the optical signal detecting apparatus.

Figure 8:
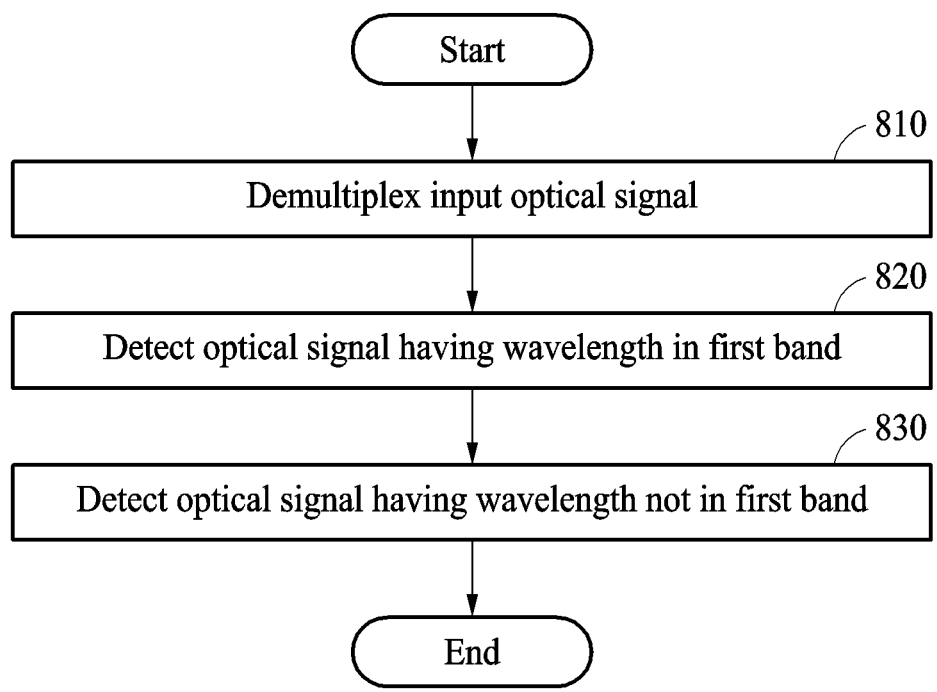
FIG. 8 is a flowchart illustrating an example of an optical signal detecting method according to an example embodiment.

FIG. 8 is a flowchart illustrating an example of an optical signal detecting method according to an example embodiment.

An optical signal detecting method to be performed by an optical signal detecting apparatus, for example, the optical signal detecting apparatus described with reference to at least of FIGS. 1 through 7, may include operations to be described hereinafter.

Referring to FIG. 8, in operation 810, the optical signal detecting apparatus demultiplexes, using an optical demultiplexer, an incident or input optical signal into a first optical signal having a first band wavelength and a second optical signal having a second band wavelength. That is, the optical demultiplexer demultiplexes the incident optical signal. In operation 820, the optical signal detecting apparatus detects the first optical signal using a first optical detector. In operation 830, the optical signal detecting apparatus detects the second optical signal using a second optical detector. Here, operations 820 and 830 may be performed concurrently, or one of the operations may be performed prior to the other. The optical demultiplexer, the first optical detector, and the second optical detector, which are included in the optical signal detecting apparatus, may be provided in a TO-CAN package.

According to example embodiments, TO-CAN package-based low-cost optical signal detecting module may be provided.

According to example embodiments, by applying an optical arrangement structure in which an optical demultiplexer and an optical detector are provided in a signal TO-CAN package and the package is sealed, an entire process may be simplified and a unit cost of an optical signal detecting module may be reduced by using such a low-cost package.

The components described in the example embodiments of the present disclosure may be achieved by hardware components including at least one digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitter outline can (TO-CAN) package including an optical signal detecting apparatus, the optical signal detecting apparatus comprising:
   a transmitter outline stem (TO-STEM);
   a spacer mounted on a surface of the TO-STEM;
   an optical demultiplexer configured to demultiplex an input optical signal into a first optical signal having a first band wavelength and a second optical signal having a second band wavelength, the optical demultiplexer being mounted on a first surface of the spacer, the surface of the TO-STEM being parallel to the first surface of the spacer;
   a first optical detector configured to detect the first optical signal; and
   a second optical detector configured to detect the second optical signal, the first and second optical detectors being mounted on the surface of the TO-STEM.

2. The optical signal detecting apparatus of claim 1, wherein the optical demultiplexer, the first optical detector, and the second optical detector, disposed on the TO-STEM of the TO-CAN package, are sealed by a sealing cap including a transparent element the sealing cap being mounted on the surface of the TO-STEM.

3. The optical signal detecting apparatus of claim 2, wherein the input optical signal is transmitted through the transparent element to be incident on the optical demultiplexer.

4. The optical signal detecting apparatus of claim 1, wherein the optical demultiplexer comprises an optical filter configured to transmit the first optical signal and reflect the second optical signal.

5. The optical signal detecting apparatus of claim 4, wherein the optical demultiplexer comprises a first reflector configured to reflect the second optical signal reflected by the optical filter.

6. The optical signal detecting apparatus of claim 5, wherein the optical filter is disposed on a first inclined block mounted on the first surface of the spacer and the first reflector is disposed on a second inclined block.

7. The optical signal detecting apparatus of claim 6, wherein the optical demultiplexer further comprises a second reflector disposed on the first inclined block and configured to reflect the second optical signal reflected by the first reflector.

8. The optical signal detecting apparatus of claim 7, wherein the second optical signal reflected by the second reflector is again reflected by the first reflector to be received by the second optical detector.

9. The optical signal detecting apparatus of claim 4, wherein the optical demultiplexer comprises:
   a first inclined block on which the optical filter is disposed; and
   a second inclined block, separate and distinct from the first inclined block, on which a reflector is disposed,
   wherein the first optical signal passes through the optical filter and the first inclined block to be input to the first optical detector, and the second optical signal is reflected by the reflector to be input to the second optical detector.

10. The optical signal detecting apparatus of claim 4, wherein the optical demultiplexer comprises:
    a first inclined block on which the optical filter and a first reflector are disposed;
    a second inclined block on which a second reflector is disposed, wherein the first optical signal passes through the optical filter and the first inclined block to be input to the first optical detector, and the second optical signal is reflected by the first and second reflectors to be input to the second optical detector.

11. The optical signal detecting apparatus of claim 1, further comprising:

a first optical coupling lens configured to focus and transmit the first optical signal towards the first optical detector; and a second optical coupling lens configured to focus and transmit the second optical signal towards the second optical detector; the first and second optical coupling lenses being mounted on a second surface of the spacer facing the first and second optical detectors.

12. The optical signal detecting apparatus of claim 11, wherein the first optical detector is configured to detect the first optical signal transmitted from the first optical coupling lens.

13. The optical signal detecting apparatus of claim 11, wherein the second optical detector is configured to detect the second optical signal transmitted from the second optical coupling lens.

14. The optical signal detecting apparatus of claim 11, wherein:

the first optical coupling lens is disposed separately from the first optical detector, and the second optical coupling lens is disposed separately from the second optical detector.

15. A transmitter outline can (TO-CAN) package including an optical signal detecting apparatus, the optical signal detecting apparatus comprising:

a transmitter outline stem (TO-STEM);

a spacer mounted on a surface of the TO-STEM;

an optical demultiplexer configured to demultiplex optical signals transmitted by an incident light, the optical demultiplexer being disposed on a first surface of the spacer;

a first optical coupling lens configured to transmit a demultiplexed first optical signal having a wavelength corresponding to a first passband of the incident light, the first optical coupling lens being disposed on a second surface of the spacer opposite the first surface of the spacer;

a second optical coupling lens configured to transmit a demultiplexed second optical signal having a wavelength corresponding to a second passband of the incident light, the second optical coupling lens being disposed on the second surface of the spacer;

a first optical detector configured to detect the demultiplexed first optical signal transmitted from the first optical coupling lens; and a second optical detector configured to detect the demultiplexed second optical signal transmitted from the second optical coupling lens, the first and second optical detectors being disposed on the surface of the TO-STEM, wherein the optical demultiplexer is connected between an input optical waveguide and an output optical waveguide.

* * * * *